Figure 1:
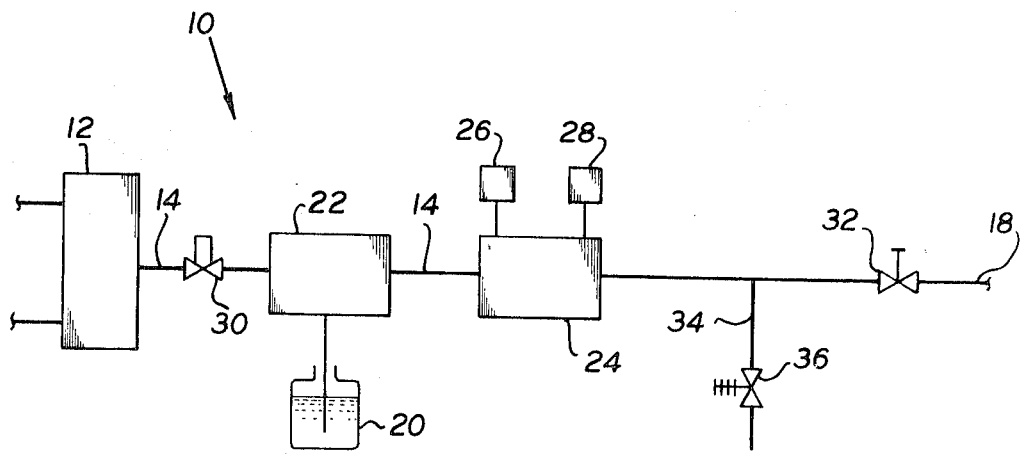

United States Patent

[11] 3,601,255

[72] Inventors Edwin A. Pecker
 Los Angeles;
 Thomas B. Quinn, Pacific Palisades; Philip
 A. Wenger, Grenada Hill, all of, Calif.
[21] Appl. No. 817,882
[22] Filed Apr. 21, 1969
[45] Patented Aug. 24, 1971
[73] Assignee Vernitron Corporation
 New York, N.Y.

[54] DIALYSATE DELIVERY SYSTEM
 1 Claim, 2 Drawing Figs.
[52] U.S. Cl. .................................................. 210/321,
 137/456
[51] Int. Cl. .................................................. B01d 13/00,
 C02b 1/82

[50] Field of Search .................................. 210/321,
 322; 137/88, 90, 93, 456

[56] References Cited
 UNITED STATES PATENTS
 3,298,383  1/1967  Cooper ........................... 137/88
 3,352,779  11/1967 Austin ............................ 210/321 X
 3,457,941  7/1969  Cook .............................. 137/108 X Primary Examiner—Alan Cohan
Attorney—Edward H. Loveman ABSTRACT: A system for delivering a dialysate to an artificial kidney device. The system includes a unique valving and control arrangement for bypassing a sensor device which senses and controls the flow of dialysate to the kidney device whenever it is desired to rapidly adjust the temperature and conductivity of the dialysate to a predetermined operating range.

PATENTED AUG 24 1971　　　3,601,255

INVENTORS
EDWIN A PECKER
THOMAS B QUINN
PHILIP A. WENGER
BY
Edward H Loveman
ATTORNEY

DIALYSATE DELIVERY SYSTEM

This invention relates to a fluid-circulating system and, more particularly, to a system for the continuous mixing and delivery of a plurality of fluids which are adapted to be formed into a dialysate solution for delivery to a dialyzer device. Moreover, the invention is especially concerned with the continuous supply of dialysate to an artificial kidney device under controlled thermal and conductivity operating ranges or parameters.

In essence, dialysis is a process fore separating compounds or materials by the difference in their rates of diffusion through a semipermeable membrane. Thus, in effect, a dialyzer is an apparatus for carrying out the dialysis process, and basically consists of two chambers which are separated by a semipermeable membrane. A fluid to be treated is passed through one chamber of the apparatus and a dialysate fluid or solvent is passed through the other chamber. Substances constituted of small particles diffuse from the solution through the membrane and into the solvent much more rapidly than amorphous substances, colloids, or large molecules, whereby a selective, predictable purification of the fluid being treated is accomplished.

In recent years the dialysis process has been used in artificial kidney devices to aid patients who have experienced kidney function failure. The artificial kidney devices include, among others, the well-known kill dialyzer, the Dow Hollow Fiber Kidney and various types of coil dialyzers. A blood purification process consists of flowing the patient's blood through one chamber of a dialyzer, while an approximately isotonic, aqueous solution of glucose and salts is pumped through the other dialyzer chamber. Certain materials which are normally removed by the natural kidneys from the blood pass from the blood through the membrane into the isotonic solution of dialysate. As a result, or blood is thereby purified to an extent somewhat similar to that achieved by the natural kidneys, and then leaves the dialyzer to be returned to the patient's body.

For example, in a typical hemodialysis treatment program, the patient is coupled to the artificial kidney dialyzer for perhaps two 12-hour periods per week to accomplish the blood purification normally performed by natural kidneys. During these treatment periods, it is important that a continuous flow of dialysate to delivered to the dialyzer. For simplicity and economy, it may be desirable to provide a dialysate source capable of delivering dialysate to a number of dialyzers to permit simultaneous treatment of a number of patients.

Generally, dialysis fluid is commercially manufactured in a concentrated form, mixed and diluted with water in a prescribed ratio, and then pumped or delivered to the artificial kidney dialyzer. Various devices and methods for mixing dialysis fluid and water, and delivering the admixture to dialyzers are widely known and used.

In supplying dialysate solution to the dialyzer device or artificial kidney, it is extremely important that the temperatures and conductivity of the dialysate be maintained at all times within prescribed operating ranges. Since any appreciable variations in the temperature or conductivity of the dialysate being delivered to the dialyzer may have serious repercussions in affecting the patient's physical condition, it is absolutely essential that dialysate delivery systems incorporate adequate safeguards to that effect. Thus, when starting or restarting the dialysate flow in the delivery system, it becomes necessary to provide suitable dialysate delivery or flow control means which will assure that the dialysate has attained its proper temperature and conductivity operating range or parameter before being delivered to the dialyzer or artificial kidney.

Accordingly, in order to achieve the aforementioned object, the dialysate fluid delivery system, according to the present invention, contemplates the provision of a unique and novel bypass valve arrangement which is readily manipulated to provide continuous dialysate flow to a dialyzer device or alternatively to a drain. The bypass valve arrangement may be manually operated to divert flow of dialysate from a dialyzer device or artificial kidney toward a drain when the dialysate temperature or conductivity exceeds or falls below its required operating ranges. When starting or restarting the system, the bypass valve arrangement may be set to allow flow of dialysate into a drain while simulating actual flow conditions for a dialyzer, until the temperature and conductivity of the dialysate fluid reaches its proper operating range. At this time, the bypass valve may be manually reset or manipulated so as to direct the dialysate fluid flow toward the dialyzer or artificial kidney device. This, in effect, will facilitate the continuous flow of dialysate toward the dialyzer under controlled temperature and conductivity ranges.

Another feature of the present invention lies in a unique sensor device and control which is adapted to continuously monitor the temperature nd conductivity of the dialysate fluid flowing through the dialysate delivery system. When the sensor device detects a deviation in temperature or conductivity in the dialysate, a suitable alarm may be actuated. Concurrently, the sensor means is adapted to actuate a solenoid-operated valve so as to stop the flow of the water used for the dialysate, and also to stop the pump which conveys dialysate concentrate toward the water supply. As a result, the danger of having improperly controlled dialysate entering the artificial kidney or dialyzer is prevented.

Accordingly, it is a primary object of the present invention to provide for a novel and improved dialysate fluid delivery system.

Another object of the present invention is to provide for a novel dialysate delivery system adapted to continuously supply a controlled flow of dialysate to an artificial kidney or dialyzer.

A further object of the present invention is to provide for a dialysate delivery system having novel bypass valve means for alternatively directing the flow of dialysate toward a dialyzer device or toward a drain as may be warranted by the operating temperature or conductivity of the dialysate fluid.

Still another object of the present invention is to provide for a dialysate delivery system including a sensor device for sensing and monitoring the temperature and conductivity of the dialysate, and with the sensor device being adapted to stop the flow of fluids through the delivery system upon a dialysate temperature or conductivity deviation from a prescribed operating range.

Figure 2:
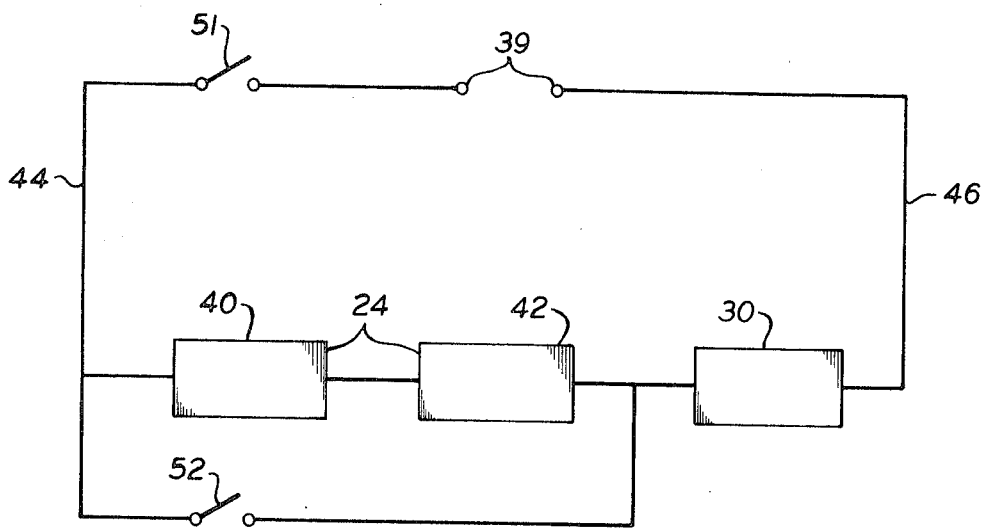

These and other objects and many of the attendant advantages of this invention will be readily appreciated as the same becomes better understood by reference to the following description when considered in connection with the accompanying drawings, in which:

fIG. 1 is a diagrammatic representation illustrating the interconnection of the components forming the dialysate fluid delivery system according to the present invention; and FIG. 2 is an electrical circuit diagram, in schematic, showing the electrical control components of the dialysate fluid delivery system of FIG. 1.

Referring now in detail to the drawings, wherein like reference characters designate like or corresponding parts throughout, there is shown in FIG. 1 a dialysate fluid supply delivery system generally designated by reference numeral 10. The system includes a thermostatic mixing valve 12 adapted to receive a continuous flow of hot and cold water and mix the water at a predetermined temperature and pressure range. The water flows through a conduit 14 to a dialyzer or artificial kidney installation (not shown) which may be suitably connected to conduit 14 at end 18.

A supply or tank 20 containing dialysate concentrate solution is connected to conduit 14. As illustrated, a pump 22 is adapted to pump dialysate concentrate into conduit 14 so as to intermix or admix with the water flowing through the conduit and thereby form the desired dialysate fluid. The mixing ratio of concentrate to water may be preset so as to provide the required water-dialysate concentrate ratio whereby the dialysate formed has the necessary conductivity. Since the thermostatic valve 12 provides the proper water temperature for the system, the dialysate pumped toward the artificial kidney or dialyzer is, theoretically, within its required temperature and conductivity range.

As the dialysate flows toward the artificial kidney or dialyzer, to which the system 10 is connected, it passes through a sensor assembly 24 which includes visual detection means or gauges 26 and 28 for sensing, respectively, the temperature and conductivity of the dialysate. If the temperature or conductivity of the dialysate deviates from a predetermined operating range, the sensor assembly 24 actuates a solenoid-operated valve 30, thereby shutting off the flow of water through conduit 14. Concurrently therewith, the sensor assembly 24 also deactivates pump 22 so as to stop the flow of the dialysate concentrate solution. This, in effect, will completely shut down the operation of the dialysate fluid delivery system 10.

In order to restart (or start) the dialysate fluid system, a unique bypass valving arrangement is provided for by the present invention. The bypass valving arrangement includes a standard two-way valve 32 in conduit 14 downstream of sensor assembly 24, and a conduit 34 connected into conduit 14. Conduit 34 extends into a normally closed pressure relief valve 36 at one end, and connects at its other end into conduit 14 downstream of sensor assembly 24 but upstream of a two-way valve 32, thereby forming, in effect, a three-way valve arrangement.

When it is desired to restart (or start) the system 10, the two-way valve 32 is manually turned or moved to a closed position, thereby blocking flow through conduit 14. The valve 32 may incorporate a suitable interlock which disconnects the sensor assembly 24 alarm system while valve 32 is in the closed position. This will initiate flow of water and dialysate concentrate in conduit 14. However, since valve 32 is closed, the dialysate flow is diverted toward pressure relief valve 36, and upon reaching a pressure higher than the normal system pressure, the dialysate will force open valve 36 and flow into a drain (not shown).

As the temperature and conductivity of the dialysate flowing through conduit 14 and sensor assembly 24 reaches the proper operating ranges, valve 32 may be manually opened, thereby closing pressure relief valve 36 and permitting flow of dialysate toward the artificial kidney or dialyzer device to which the system 10 is connected. When the valve 32 is opened, its electric interlock will again actuate or rather prime the sensor assembly 24 so that its alarm system is ready to detect deviations in the dialysate temperature or conductivity.

Referring now to the electrical schematic diagram illustrated in FIG. 2 of the drawings, a suitable source of power 39 is adapted to supply current to the sensor assembly 24 via leads 44 and 46 when a switch 51 is closed. The sensor assembly 24 includes a dialysate temperature sensor 40, having an upper and lower operating range alarm therein and a dialysate conductivity sensor 42 also having an upper and lower range alarm. As illustrated in FIG. 2, the sensors 40 and 42 are connecting in series with one another across the leads 44 and 46 and in series with the solenoid valve 30. Thus, in operation, when the temperature or conductivity of the dialysate exceeds its normal operating range, a switch or relay within the respective sensors 40 or 42 will open, thereby preventing electrical power from being applied to the solenoid valve 30 which closes and shuts off the flow of water in conduit 14. Although not shown, the power to drive the pump 22 may be obtained from the same point in the circuit as the solenoid. Therefore, when the solenoid valve is closed concurrently therewith, the pump 22 is also shut down to thereby stop the flow of dialysate concentrate from tank 20.

Upon restarting or starting the system 10, the valve 32 (FIG. 1) is manually closed which will automatically close a switch 52 which, as shown in FIG. 2, is connected between the power lead 44 and the solenoid valve 30 whereby the solenoid valve will open and permit flow of water to the valve 32. Simultaneously with the actuation of the solenoid valve 30, the pump 22 will be energized to pump the dialysate concentrate. With the valve 32 closed, the pressure in the system will, of course, as previously described, cause the bypass valve 36 to open, permitting the mixture to flow to drain. When the dialysate mixture reaches the preset temperature and conductivity operating range, the valve 32 is opened thereby opening switch 52 and placing the sensor assembly alarm 24 in its original position for detecting variations in the dialysate operating ranges.

It should be noted that only features necessary for disclosing the novel valving and control arrangement for bypassing the sensor device have been shown and that if desired, additional temperature indicators, pressure regulators, filters and flow restrictors could be added.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

We claim:

1. In a fluid delivery system for mixing and delivering a dialysate fluid to a dialyzer within a predetermined temperature range and a predetermined conductivity range as determined by a sensor means which senses and controls the temperature and conductivity of said dialysate solution prior to delivery thereof, to said dialyzer, the improvement comprising, valve means for controlling flow to said sensor means, further valve means interposed in said delivery system intermediate said sensor means and said dialyzer, said further valve means comprising a first normally open two-way valve adapted to be closed and thereby prevent flow of dialysate fluid to said dialyzer and a second valve means responsive to the closing of said first valve means for diverting the flow of said dialysate fluid to a drain, control means operatively associated with said valve means and said sensor means for automatically closing said valve means in response to said sensor means detecting temperature or conductivity deviations of said dialysate fluid outside said predetermined range, and interlock means responsive to closing of said two-way valve for rendering said control means inoperative to thereby permit said valve means to remain open regardless of the conditions sensed by said sensor means.